(12) United States Patent
Pope et al.

(10) Patent No.: US 9,225,807 B2
(45) Date of Patent: Dec. 29, 2015

(54) DRIVER LEVEL SEGMENTATION

(71) Applicant: SOLARFLARE COMMUNICATIONS, INC., Irvine, CA (US)

(72) Inventors: Steven L. Pope, Costa Mesa, CA (US); David J. Riddoch, Fenstanton (GB)

(73) Assignee: SOLARFLARE COMMUNICATIONS, INC., Irvine, CA (US)

( * ) Notice: Subject to any disclaimer, the term of this patent is extended or adjusted under 35 U.S.C. 154(b) by 0 days.

(21) Appl. No.: 14/700,101

(22) Filed: Apr. 29, 2015

(65) Prior Publication Data

US 2015/0237176 A1    Aug. 20, 2015

Related U.S. Application Data

(63) Continuation of application No. 12/513,132, filed as application No. PCT/GB2007/003994 on Oct. 18, 2007, now Pat. No. 9,077,751.

(30) Foreign Application Priority Data

Nov. 1, 2006    (GB) .................................... 0621774.9

(51) Int. Cl.
*H04L 29/06*    (2006.01)
(52) U.S. Cl.
CPC .............. *H04L 69/22* (2013.01); *H04L 69/161* (2013.01); *H04L 69/166* (2013.01)

(58) Field of Classification Search
CPC ....... H04L 69/16; H04L 69/161; H04L 69/22; H04L 69/166
See application file for complete search history.

(56) References Cited

U.S. PATENT DOCUMENTS

| 2005/0147126 A1* | 7/2005 | Qiu et al. ...................... 370/474 |
| 2006/0056405 A1* | 3/2006 | Chang et al. .................. 370/389 |
| 2007/0025395 A1* | 2/2007 | Cardona et al. ............... 370/474 |

* cited by examiner

*Primary Examiner* — Jae Y Lee
(74) *Attorney, Agent, or Firm* — Haynes Beffel & Wolfeld LLP; Warren S. Wolfeld

(57) ABSTRACT

A method for performing segmentation of a first data packet into a plurality of second data packets at a functionality of a device driver for a network interface device supported by a data processing system, each second data packet comprising a header and a segment of data from the first data packet and the network interface device being capable of supporting a communication link over a network with another network interface device, the method comprising: accepting the first data packet, the first data packet carrying data for transmission by the network interface device over the network; forming a set of headers for the plurality of second data packets; writing the set of headers to memory; forming a specification, the specification indicating the headers in memory and the segments of data in the first data packet; requesting by means of the device driver transmission by the network interface device of the headers and the respective segments of data indicated in the specification so as to effect transmission of the second data packets over the network.

11 Claims, 3 Drawing Sheets

DRIVER LEVEL SEGMENTATION

CROSS REFERENCE AND RELATED APPLICATIONS

This application is a continuation of U.S. application Ser. No. 12/513,132 entitled "Driver Level Segmentation" by Steven L. Pope and David J. Riddoch filed Dec. 15, 2009, which is a US National Stage Entry of PCT Application PCT/GB2007/003994 entitled "Driver Level Segmentation Offload", filed Oct. 18, 2007.

BACKGROUND OF THE INVENTION

This invention relates to packet segmentation and reassembly at a driver-level functionality associated with a network interface device.

One of the functions of a transport protocol is the reassembly of received segments of data from the underlying network layers and the segmentation of data received from upper layers of the protocol stack into units of data which are suitable for transmission by the underlying network.

The CPU overhead of both of these operations has long been understood to be costly. Recently network interface hardware (such as that manufactured by Neterion Inc.) has been introduced which is capable of performing these operations on behalf of the host CPU and in accordance with the Microsoft Windows network task offload architecture. The HP Whitepaper, "TCP Segmentation Offload (TSO) Performance on HP rp4440 Servers", dated August 2004 investigates the improvement in performance available when a TSO implementation is used, as compared with a conventional non-offloaded segmentation architecture.

However, another approach supposes that the real cost in CPU overhead is not the segmentation or reassembly operations themselves, but the repeated traversal of a complex multi-layered software protocol stack. Rather than introducing complex hardware to perform segmentation and reassembly, it would therefore be desirable to perform both these functions in software outside the protocol stack so as to reduce the number of traversals of the protocol stack both on transmission and reception and hence the per-packet overhead of protocol processing.

Recently the utility of this approach has been recognised by the maintainers of the Linux kernel and a generic transmit segmentation offload module has been implemented which performs this function at the lowest layer of the generic kernel network stack. This development is detailed in the article "Linux Generic Segmentation Offload" available at http://lwn.net/Articles/189970 and dated June 2006.

SUMMARY OF THE INVENTION

According to a first aspect of the present invention there is provided a method for performing segmentation of a first data packet into a plurality of second data packets at a functionality of a device driver for a network interface device supported by a data processing system, each second data packet comprising a header and a segment of data from the first data packet and the network interface device being capable of supporting a communication link over a network with another network interface device, the method comprising: accepting the first data packet, the first data packet carrying data for transmission by the network interface device over the network; forming a set of headers for the plurality of second data packets; writing the set of headers to memory; forming a specification, the specification indicating the headers in memory and the segments of data in the first data packet; and requesting by means of the device driver transmission by the network interface device of the headers and the respective segments of data indicated in the specification so as to effect transmission of the second data packets over the network.

Preferably the device driver is operable to indicate to the data processing system that the network interface device is capable of performing transmit segmentation. Suitably the network interface is not capable of performing transmit segmentation.

Preferably the device driver is operable to indicate to the data processing system that the network interface device is capable of performing a checksum calculation on each segment of data.

Preferably TCP flow control is performed at a network protocol stack of the data processing system.

Preferably the size of the first data packet is greater than the maximum packet size allowed by the network segment to which the data processing system is connected.

Preferably the maximum size of the second packets is indicated to the device driver by the data processing system. The maximum size of the second packets may be indicated to the device driver in a header of the first data packet. Preferably the size of each of the plurality of second data packets is not greater than the maximum packet size allowed by the network segment to which the data processing system is connected. Further preferably, the size of each of the plurality of second data packets is not greater than the maximum packet size allowed over the connection over which those packets are to be sent.

Suitably the network interface card is compatible with Ethernet. Suitably the network protocol is TCP/IP.

The set of headers may be written to a first area of the memory. The step of accepting the first data packet may include the step of receiving the first data packet at a second area of the memory. Preferably the first area of the memory is allocated to the device driver. Preferably the second area of the memory is allocated to the device driver.

The first data packet may be received in fragments and the fragments enqueued at the second area of the memory. Segmentation of the first data packet may start before all the fragments of the first data packet have been received.

Preferably the step of requesting transmission of the headers and the respective segments of data indicated in the specification is by means of a single request to the network interface device.

Preferably the network interface device is operable to access the first and second areas of the memory by Direct Memory Access.

Preferably the header of the first data packet includes a first identifier and all the headers of the second data packets include the first identifier.

Preferably the step of forming a set of headers for the plurality of second data packets includes the step of calculating an offset for each header in the set, the offset of a header being the position in bytes of its respective segment of data in the first data packet. Suitably the step of forming a set of headers for the plurality of second data packets includes the step of calculating a checksum for each header in the set, the checksum of a header being calculated using its respective segment of data.

According to a second aspect of the present invention there is provided a method for transmitting data by means of a data processing system, the system being capable of supporting an operating system and at least one application and having access to a memory and a network interface device capable of supporting a communication link over a network with another network interface device, the method comprising the steps of: an application having data for transmission requesting a functionality of the operating system to send the data to be transmitted; responsive to that request: forming the data into at least one first data packet at a network protocol stack of the system; sending an indication to a device driver of the network interface device that the at least one first data packet is to be transmitted over the network; and subsequently: performing segmentation of each first data packet into a plurality of second data packets at a functionality of the device driver, each second data packet comprising a header and a segment of data; the segmentation step including: forming a set of headers for the plurality of second data packets; writing the set of headers to memory; and forming a specification, the specification indicating the headers in memory and the segments of data in the first data packet; requesting by means of the device driver transmission by the network interface device of the headers and the respective segments of data indicated in the specification so as to effect transmission of the second data packets over the network.

Preferably the device driver is operable to indicate to the operating system or network protocol stack that the network interface device is capable of performing transmit segmentation. The network interface may not be capable of performing transmit segmentation.

Preferably the size of the first data packet is greater than the maximum packet size allowed by the network segment to which the data processing system is connected.

Preferably the maximum size of the second packets is indicated to the device driver by the operating system. Preferably the maximum size of the second packets is indicated to the device driver in a header of the first data packet. Preferably the size of each of the plurality of second data packets is not greater than the maximum packet size allowed by the network segment to which the data processing system is connected. Further preferably the size of each of the plurality of second data packets is not greater than the maximum packet size allowed over the connection over which those packets are to be sent.

Suitably the operating system is Microsoft Windows.

According to a third aspect of the present invention there is provided a method for performing reassembly of data packets at a functionality of a device driver for a network interface device supported by a data processing system, each data packet comprising a header and a segment of data and being received by the network interface device over a communication link with another network interface device, the method comprising: accepting data packets from the network interface device at the functionality of the device driver; enqueueing each data packet of a first set of the data packets at a first queue in memory, the first queue comprising at least a first data packet; modifying the header of the first data packet in the first queue so as to include the segment of data of each newly-enqueued data packet of the first set; defining a specification, the specification indicating the segments of data of the newly-enqueued data packets of the first set in the first queue; and, in response to one or more first predetermined conditions being met: causing a superpacket comprising the header of the first data packet in the first queue and the segments of data indicated by the specification to be passed to a network protocol stack of the data processing system for subsequent protocol processing.

Preferably the step of modifying the header of the first data packet includes modifying an indication of packet size in the header of the first data packet.

Preferably the size of the superpacket is greater than the maximum packet size allowed by the network segment to which the data processing system is connected.

The first predetermined conditions may include: a) the number of data packets at the first queue is a predetermined number; b) the total size of the data packets at the first queue is a predetermined size; c) a predetermined time has elapsed since the first data packet was enqueued at the first queue.

The method may further comprise: enqueueing each data packet of a second set of the data packets at a second queue in memory, the second queue comprising at least a first data packet; modifying the header of the first data packet in the second queue so as to include the segment of data of each newly-enqueued data packet of the second set; defining a specification, the specification indicating the segments of data of the newly-enqueued data packets of the second set in the second queue; and, in response to one or more first predetermined conditions being met: causing a superpacket comprising the header of the first data packet in the second queue and the segments of data indicated by the specification to be passed to a network protocol stack of the data processing system for subsequent protocol processing.

Preferably data packets of the first set belong to a first data flow and data packets of the second set belong to a second data flow. Suitably the data packets are TCP/IP data packets and the first and second data flows are different IP data flows.

Preferably the step of accepting data packets from the network interface device includes: if at least one data packet from the network interface device belongs to a data flow for which a queue has not yet been established, defining a new queue in memory for that data flow. Preferably the subsequent steps of the method are performed as though the at least one data packet is the first set of data packets and the new queue is the first queue.

Preferably if one or more second predetermined conditions are met, the enqueueing, modifying and defining steps are replaced with the steps of: passing the data packets to the network protocol stack of the data processing system for subsequent protocol processing. The second predetermined conditions may include: a) at least some of the data packets are fragmented; b) at least some of the data packets are out of sequence; c) at least some of the data packets do not contain a segment of data; d) the data packets are TCP/IP data packets and at least some of the data packets have one of RST, SYN or URG TCP flags set.

DESCRIPTION OF THE DRAWINGS

The present invention will now be described by way of example with reference to the accompanying drawings, in which.

DETAILED DESCRIPTION OF THE DRAWINGS

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
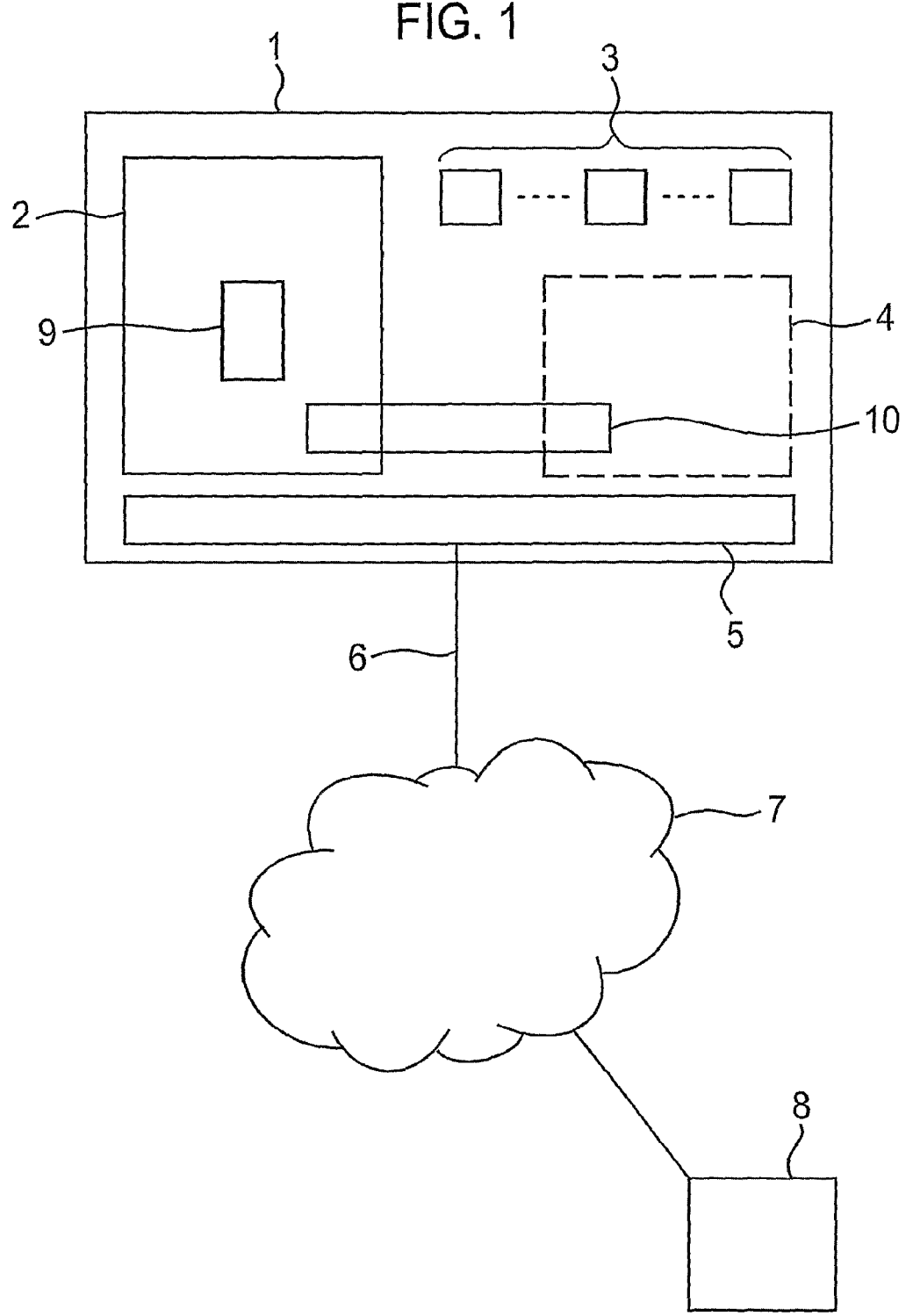
FIG. 1 shows a data processing system in accordance with the present invention.

FIG. 1 shows a data processing system 1 capable of operating in accordance with the present invention. Data processing system 1 supports an operating system 2, one or more applications 3, a memory 4, and a network interface device 5. The network interface device is operable to support a communication link 6 over a network 7 with another network interface device 8, so as to allow the communication of packetised data between the two network interface devices. Typically the operating system provides a network protocol stack 9, capable of performing protocol processing of data received from the one or more applications for transmission over the network. However, the network protocol stack may alternatively be provided by a user mode functionality or embodied in hardware.

A device driver 10 provides a software interface for the network interface device, suitably allowing functionalities of the operating system or user space processes to interact with the network interface device. This interaction may be for the purposes of receiving or transmitting data over the network, controlling the state of the network interface device, or providing state information about the network interface device, to name but a few. The device driver may include one or more driver modules (such as miniport drivers, class drivers, virtual device drivers) and functionalities. The modules and functionalities of the device driver may operate in either kernel mode or user mode, but preferably at least part of the device driver operates in kernel mode so as to provide a driver interface to the operating system.

In accordance with the present invention, the device driver includes at least one functionality operable to perform one or both of segmentation and reassembly of data packets that are to be transmitted or have been received over the network. Preferably this device driver functionality operates in kernel mode. Suitably the device driver is a device driver for an Ethernet network interface device. Suitably the device driver and network interface device are operable to handle TCP/IP traffic data.

Data processing system 1 may be any kind of system for processing data, including, but not limited to, a personal computer, a server, a switch or a router. The operating system may be any suitable software or firmware, such as Microsoft Windows or any of the Unix or Linux variants.

Memory 4 may be any kind of memory or storage device known in the art. Typically the memory will support the work space and data storage of the applications and operating system. Preferably memory resources are handled by the operating system, which may allocate portions of the memory to the applications, processes and other functionalities of the data processing system. Memory portions may be allocated exclusively to a process, application or functionality by the operating system so as to prevent other processes, applications or functionalities accessing those memory portions.

A first aspect of the present invention relates to segmentation of data packets at the device driver 10, or a functionality thereof. When an application 3 has data to transmit over the network, it typically makes a request for transmission through a functionality of the operating system. In Windows, this is usually by means of the Winsock Application Programming Interface (API). The Winsock is arranged to direct the transmission request to a network protocol stack available to the operating system by which the data should be sent. For example, data destined for a host on a local Ethernet network may be sent to a TCP/IP stack of the operating system for formation into packets and transmission over the network by the network interface device.

Packet-based transmission protocols generally require data for transmission to be segmented into many data packets whose size is determined by the properties of the physical network. Each data packet must be processed in accordance with the necessary protocols before being transmitted across the network. In the case of complex protocol stacks such as TCP/IP this introduces significant processing overheads due to: a) the traversal of data across the protocol stack—for example, in the repeated copying of data segments; and b) the control processing associated with the data traversing the stack in multiple data segments—in particular, in the processing associated with data repeatedly traversing the generic driver API, which presents an abstraction of the hardware to the protocol stack. The abstraction provided by the generic driver API is generalised so as to be capable of representing any of a large number of different hardware-specific drivers and there is therefore a high processing cost involved with invoking this API. For example, often the network hardware capabilities must be determined so as to determine which of the generic driver API operations are appropriate in a given circumstance.

The present invention reduces these processing overheads by causing the data for many packets to traverse the stack in one "superpacket" and performing segmentation of the superpacket after protocol processing by the protocol stack. Preferably such superpackets are larger than may be sent over the physical network. The superpacket will generally not be greater in size than the TCP transmit window size—the transmit window size being the amount of data which may be transmitted over a particular connection without getting an acknowledgement from the destination host at the other end of the connection. The transmit window size is typically a dynamic parameter that can rapidly change based upon calculations performed by the operating system or protocol stack.

Preferably initial protocol processing of the packet is performed by the protocol stack. This ensures that flow control of higher level protocols such as TCP remains with the protocol stack and the methods of the present invention may operate without modification to the stack. The protocol stack may not be aware that segmentation will subsequently occur at the device driver, with parameters of the protocol stack controlling segment size being modified so as to cause the stack to process "super-sized" data packets (i.e. of a size larger than the MSS for the connection).

However, preferably the protocol stack is aware that the supersize IP packets it generates are to be subsequently segmented before transmission. In which case, the device driver preferably receives an indication of the required IP segment size from the protocol stack or operating system. This may be passed down to the device driver with the superpacket—for example, as a parameter in the header of the superpacket. Preferably the indicated segment size will be the MSS for the connection.

In a preferred embodiment, the device driver is operable to indicate to the protocol stack and/or the operating system that the NIC is capable of performing transmit segmentation. The protocol stack may thus generate superpackets on the assumption that the NIC will subsequently perform segmentation of those superpackets: in fact, that segmentation will be performed by the device driver of the NIC.

The MSS is the largest data segment size that TCP will enqueue for transmission at the IP layer and is a value maintained by TCP for each end-to-end connection. Typically the MSS is not greater in size than the path MTU for the connection.

Microsoft Windows provides a mechanism by which segmentation of data packets may be performed after initial processing by the system protocol stack. The Windows network task offload architecture allows TCP/IP segmentation to be offloaded to a suitable network interface device (NIC) if its miniport driver indicates to the operating system (OS) that the network interface device is capable of TCP/IP segmentation offload. As in other operating systems, the NIC may further perform the TCP/IP checksum calculation in hardware if its driver indicates that capability to the OS.

With segmentation offload, TCP can pass a send buffer for transmission that is larger than the maximum segment size (MSS) supported by the end to end connection associated with the data of the send buffer. Typically the MSS will be the minimum MTU of all the network segments over which a particular connection is carried—i.e. the path MTU. A network interface device capable of segmentation offload uses the headers of the send buffer (or "superpacket") to define headers and data segments of a size not greater than the MSS for transmission over a network.

The present invention may be implemented in the Windows network task offload architecture. In these embodiments, the device driver of the network interface device (or some element of the driver structure, such as a miniport driver) indicates to the operating system that the NIC is capable of performing TCP/IP segmentation. In fact, the NIC need not be capable of performing TCP/IP segmentation. The operating system will thus generate send buffers and attempt to pass these to the NIC by calling the necessary functions of its device driver. In accordance with the present invention, the device driver is operable to accept the send buffer and perform segmentation at the device driver rather than at the NIC, and subsequently pass the segmented data packets to the NIC for transmission over the network.

Figure 2:
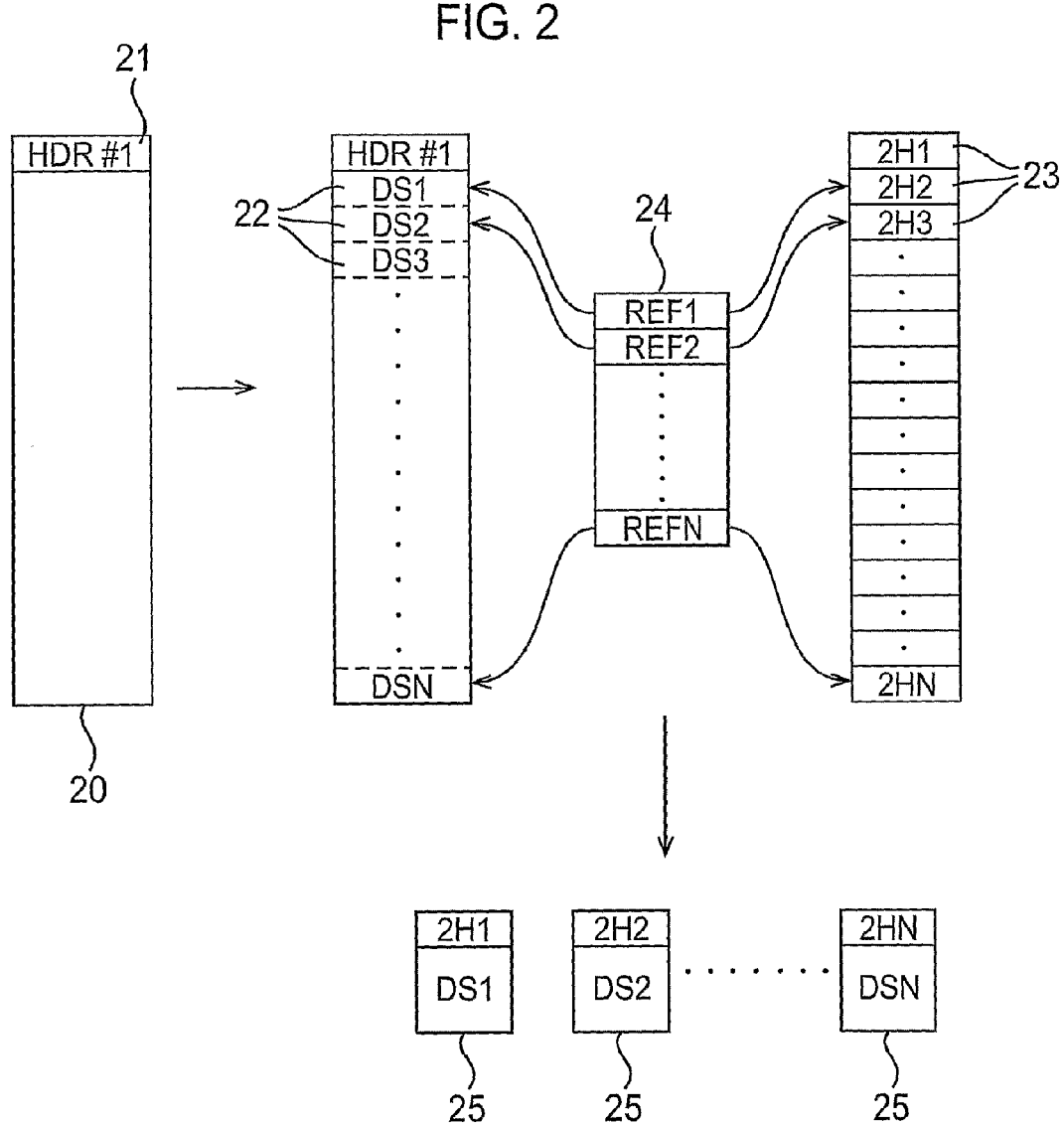
FIG. 2 shows a method for performing segmentation at a device driver in accordance with the present invention.

FIG. 2 illustrates a method for performing segmentation at a device driver in accordance with the present invention. Data packet (or send buffer) 20, is generated by a network protocol stack of the system. Generally data packet 20 is larger than the maximum segment size (MSS) that may be sent over the network (i.e. it is a "superpacket"). The data packet may be generated in accordance with the Windows segmentation offload architecture, or by any other protocol stack. Header 21 is generated by the protocol stack in accordance with the protocol by which the data is to be sent. Suitably this may be TCP/IP, and the header contains TCP and IP header information. However, other protocols may be substituted for TCP/IP, as is known in the art.

In order to transmit data packet 20, the protocol stack will call certain functions of the device driver. Typically, the device driver will accept the data packet for transmission on behalf of the NIC that it represents. The data packet may be copied to an area of memory accessible to the device driver or NIC, or more commonly a reference to the data packet or its location in memory may be passed to the device driver (in which case the device driver will be responsible for ensuring that the memory is accessible by the NIC for transmission—by calling OS routines which prevent the memory being swapped out and ensuring that the memory is visible over the IO bus and determining an address which the IO controller may use to access the memory). The device driver may accept the data packet before all of the data packet has been received. The data packet may be specified in fragments.

The device driver, or a functionality thereof, is capable of performing segmentation of the data packet in accordance with the protocols by which the data in the packet is to be sent. The device driver is preferably aware of the maximum transmission unit (MTU) of the network segment to which the host is connected. The driver may receive segmentation size information from the operating system or protocol stack with the data packet. This information may include the MSS for the data packet, i.e. the MSS of the relevant connection, and/or the path MTU for that connection. Preferably the device driver does not manipulate the data packet into a series of second data packets and store those packets whole in memory for transmission by the NIC. The device driver may be operable to start segmentation of data packet 20 before all of that data packet has been received.

In systems in which the operating system or protocol stack supports offload of IP segmentation, the device driver preferably advertises or indicates in some manner to the operating system or protocol stack that the NIC it represents is capable of segmentation offload. The operating system or protocol stack may then provide segmentation information with the superpacket it passes (in a manner as discussed above) to the device driver for transmission by the NIC. The segmentation information being intended to allow the NIC to perform IP segmentation of the superpacket into data packets each of which is not greater than the MSS. In accordance with the present invention, this IP segmentation is actually performed at the device driver. The segmentation information may include the MSS for the end-to-end connection and/or the Maximum Transmission Unit (MTU) for the path.

So as to minimise the number of data manipulation operations, the device driver logically divides the data carried by superpacket 20 into a series of data segments 22, each of which is not greater than the MSS size, including a header which is to be sent with the data segment. No actual division of the data packet need be performed, but sufficient information may be stored to allow the start and end of each data segment to be identified in data packet 20. This may be a set of pointers containing a reference to the start of each data segment. Alternatively, the first data segment in data packet 20 may be identified and each subsequent data segment in the packet may be inferred from the size of the data segments.

The device driver further forms a set of headers 23 for each of the data segments 22 into which data packet 20 is divided. The checksum for each header may be calculated by the device driver from each respective data segment. Alternatively, the checksum may be performed at the NIC, as is known in the art (the NIC could be capable of checksum offload in accordance with the Windows network task offload architecture). Preferably any options and flag values set in header 21 of data packet 20 are preserved in headers 23. Preferably headers 23 share the same packet identifier as header 21. Thus, TCP and IP flow control may be retained by the protocol stack, but with the processing demands of segmentation being handled by the device driver. Furthermore, only a single call to the device driver API is required to enqueue the superpacket and all the traffic data it carries at the IP layer, rather than the multiple calls required to enqueue the same traffic data were the data in packets each being below the MSS.

The device driver may be capable of calculating a byte offset for each header 23, indicating the position in bytes of its respective segment of data in data packet 20. Thus the set of headers 23 indicate the correct order of the data segments making up the data carried by data packet 20. Preferably the headers are stored in memory held privately by the device driver. Preferably this memory (or header pool) is permanently mapped and accessible to the NIC so as to allow the NIC to access new headers without the overhead cost of having to arrange for each new header or set of headers to be accessible to the NIC.

The device driver forms a specification 24, which may be of any suitable structure. The specification indicates the data segments 22 and their respective headers 23 which are to be transmitted by the NIC. The indications may be by way of pointers to the locations in memory in which the data segments and headers are held. There may be a pointer for each data segment/header pair or a single pointer to data packet 20 (or the start of the data it carries) and to the queue of headers 23 held in memory. There may be one or more specifications, each indicating a different subset of the header and data segment pairs for transmission.

Each data segment and its respective header together form a data packet 25 having a size which is not greater than the MSS for the connection over which the packet is to be sent (and as indicated by the segmentation information passed down by the operating system or protocol stack). There may be more than one data segment in a data packet 25. This may occur if, for example, the memory in which the data segments are stored is fragmented or crosses a physical page boundary. The set of data packets 25 together carry the data passed to the device driver in data packet 20 by the protocol stack. In order to send this set of data packets, or a sub-set of that set, a transmission request is sent to the network interface device. This request (or other commands sent to the NIC) may include the specification indicating the headers and data segments for transmission. Alternatively, a reference to that specification may be included. Passing a specification to the NIC allows many data packets to be enqueued for transmission with a single request or command.

Preferably the memory in which the headers are held is pre-mapped to the NIC. One or both of the specification and original data packet 20 may be stored in memory that is also pre-mapped. This allows the NIC to access the data for transmission by direct memory access (DMA).

Figure 3:
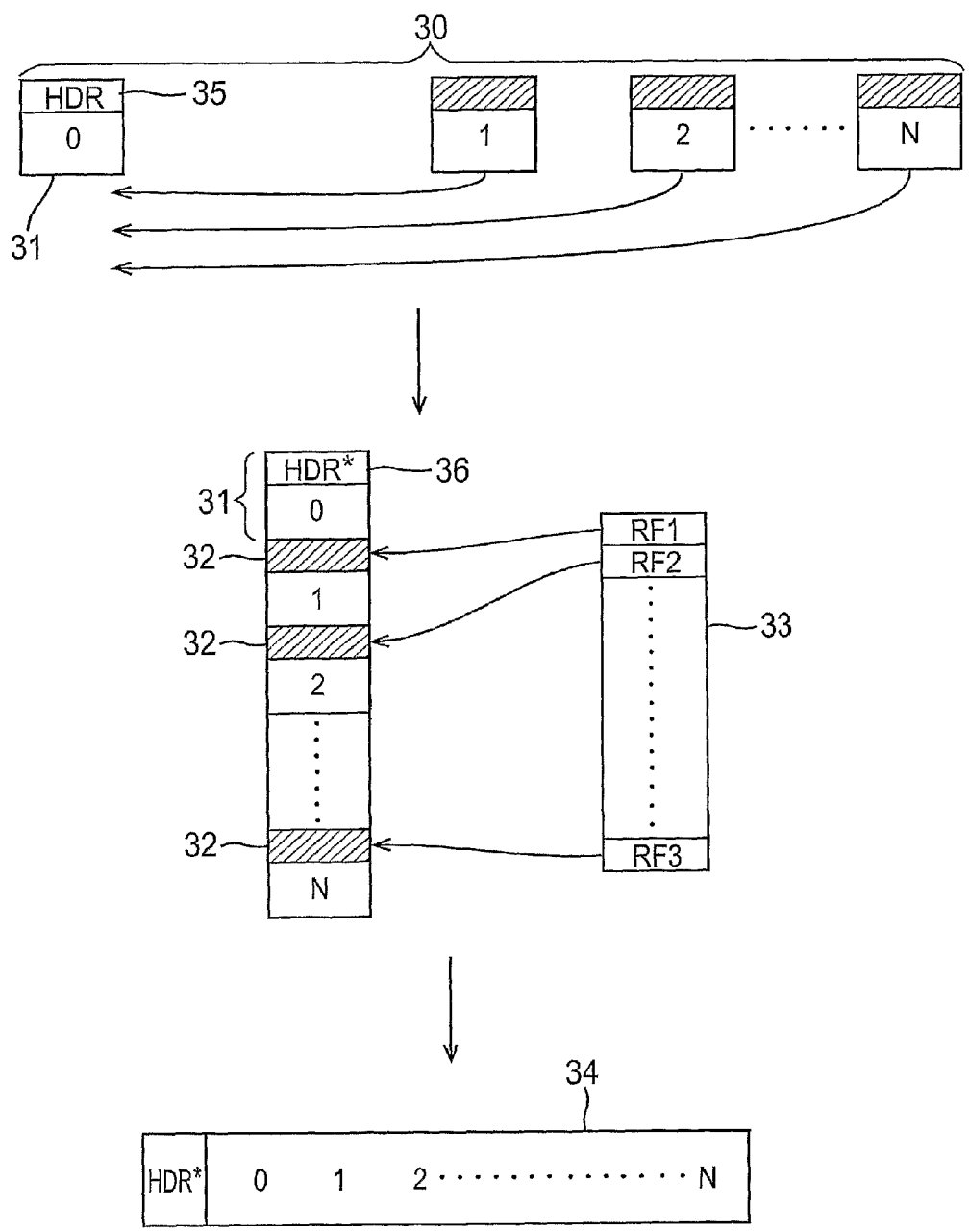
FIG. 3 shows a method for performing packet reassembly at a device driver in accordance with the present invention.

FIG. 3 shows a method for performing packet reassembly at a device driver in accordance with the present invention. The device driver is arranged to accept data packets 30 from a network interface device. The NIC may be configured to write the data packets to an area of memory by DMA. The area of memory may be held privately by the device driver. The area of memory may be indicated to the NIC by the device driver. Typically the area of memory is allocated to the device driver by the operating system and is returned to the operating system upon delivering the data for protocol processing by, for example, an RX upcall. The area of memory will be returned to the free pool once the operating system has disposed of the data. In other cases, the area of memory will be returned to the operating system by freeing up that memory area—for example, if an error is detected in an incoming packet.

The device driver is arranged to enqueue each packet onto a queue defined in memory by the device driver. Preferably each queue relates to a different data flow and each data packet is enqueued at the queue corresponding to the data flow to which it belongs. There may be a plurality of queues. If the packets are TCP/IP data packets, these data flows are distinct TCP/IP data flows.

If a data packet relates to a data flow for which there is no queue, the device driver defines a new queue for that data flow in memory available to it. It then enqueues that packet on that queue as the first data packet 31 of that queue. When a predetermined number of queues have been defined in memory, the device driver may be configured to flush all queues in the manner described below.

Data packets 30 that relate to a data flow for which a queue has been defined are enqueued at the queue corresponding to that data flow. The header 35 of the first data packet 31 in the queue is modified so as to include all the newly-enqueued data packets. This may be effected by modifying an indication of packet size (such as a length in bytes) in header 35 to include the additional data carried by the newly enqueued data packets (i.e. the data segments only). Thus, as new packets are added to the queue, header 35 is modified to include the data carried by each new data packet. In this manner, modified header 36 of the first data packet becomes a header for all the data in the queue: a superpacket 34. The data segment of the superpacket does not include the headers of the second and subsequent data packets 32.

A specification 33 is defined by the device driver to indicate the data segments in the queue which are to form the data of superpacket 34. The specification may be a series of pointers indicating the locations in memory of the data segments of the enqueued data packets. However, the specification may be in any form that provides sufficient information to the protocol stack to access the data segments. From the protocol stack's point of view, the specification may be a data structure representing a receive buffer from which the protocol stack picks up new data for processing. Thus, defining the specification simply involves adjusting the pointers of this data structure to point to the first header and data segment in the queue but only the data segments of subsequent data packets in the queue.

When the data on a queue is to be passed up to the protocol stack, the protocol stack accesses the first header and data segment and only the data segments of subsequent packets in the queue. Since the first header has been modified so as to include all the data segments of subsequent packets, the first header and the data segments together comprise superpacket 34.

The queues may be flushed when one or more of a number of predetermined conditions are met. Flushing may preferably occur on a per-queue basis. Thus, when a particular queue reaches a predetermined length it may be flushed—that is, the data on the queue may be passed up to the protocol stack. This predetermined length may be a number of bytes or a number of packets. Some or all of the queues may be flushed when a packet is received out of sequence, when there is no data in a packet, or when one of the TCP flags RST, SYN or URG are set.

Preferably when no more data packets are being received at the NIC, or after a predetermined length of time has passed since the last packet was received, some or all of the queues may be flushed.

Preferably if one or more of the data packets accepted from the NIC are not checksummed, or are fragmented, then the data packets are delivered up to the protocol stack without being reassembled by the device driver. Furthermore, the one or more queues are preferably flushed and the superpackets defined by each queues and their respective specification are also delivered up to the protocol stack.

The reassembly of data packets in accordance with the present invention is seamless as far as the protocol stack is concerned: the stack may not be aware that the device driver is reassembling received data packets into superpackets. Preferably the superpackets are larger than maximum size of data packet that may be received over the network and the protocol stack is configured to accept data packets of such a size.

The applicant hereby discloses in isolation each individual feature described herein and any combination of two or more such features, to the extent that such features or combinations are capable of being carried out based on the present specification as a whole in the light of the common general knowl-

What we claim is:

1. A method comprising:
performing reassembly of data packets at a functionality of a device driver for a network interface device supported by a data processing system, each data packet comprising a header and a segment of data and being received by the network interface device over a communication link with another network interface device, wherein the performing the reassembly comprises:
accepting data packets from the network interface device at the functionality of the device driver;
enqueueing each data packet of a first set of data packets at a first queue in memory, the first queue comprising at least a first data packet;
modifying the header of the first data packet in the first queue so as to include the segment of data of each newly-enqueued data packet of the first set;
defining a specification, the specification indicating the segments of data of the newly-enqueued data packets of the first set in the first queue; and,
in response to one or more first predetermined conditions being met:
causing a superpacket comprising the header of the first data packet in the first queue and the segments of data indicated by the specification to be passed to a network protocol stack of the data processing system for subsequent protocol processing.

2. The method as claimed in claim 1, wherein the modifying the header of the first data packet includes modifying an indication of packet size in the header of the first data packet.

3. The method as claimed in claim 1, wherein the size of the superpacket is greater than a maximum packet size allowed by a network segment to which the data processing system is connected.

4. The method as claimed in claim 1, wherein the first predetermined conditions include:
a) a number of data packets at the first queue is a predetermined number;
b) a total size of the data packets at the first queue is a predetermined size; and
c) a predetermined time has elapsed since the first data packet was enqueued at the first queue.

5. The method as claimed in claim 1, further comprising:
enqueueing each data packet of a second set of data packets at a second queue in memory, the second queue comprising at least a first data packet;
modifying the header of the first data packet in the second queue so as to include the segment of data of each newly-enqueued data packet of the second set;
defining a specification, the specification indicating the segments of data of the newly-enqueued data packets of the second set in the second queue; and,
in response to one or more first predetermined conditions being met:
causing a superpacket comprising the header of the first data packet in the second queue and the segments of data indicated by the specification to be passed to a network protocol stack of the data processing system for subsequent protocol processing.

6. The method as claimed in claim 5, wherein data packets of the first set belong to a first data flow and data packets of the second set belong to a second data flow.

7. The method as claimed in claim 1, wherein the accepting the data packets from the network interface device includes:
responsive to determining that at least one data packet from the network interface device belongs to a data flow for which a queue has not yet been established, defining a new queue in memory for that data flow.

8. The method as claimed in claim 7, wherein subsequent steps of the method are performed as though the at least one data packet is the first set of data packets and the new queue is the first queue.

9. A method comprising:
performing reassembly of data packets at a functionality of a device driver for a network interface device supported by a data processing system, each data packet comprising a header and a segment of data and being received by the network interface device over a communication link with another network interface device, the performing reassembly of data packets comprising:
accepting data packets from the network interface device at the functionality of the device driver;
responsive to determining that one or more second predetermined conditions are met, passing the data packets to a network protocol stack of the data processing system for subsequent protocol processing;
responsive to determining that the one or more second predetermined conditions are not met:
enqueueing each data packet of a first set of data packets at a first queue in memory, the first queue comprising at least a first data packet;
modifying the header of the first data packet in the first queue so as to include the segment of data of each newly-enqueued data packet of the first set; and
defining a specification, the specification indicating the segments of data of the newly-enqueued data packets of the first set in the first queue,
the method further comprising, in response to one or more first predetermined conditions being met, causing a superpacket comprising the header of the first data packet in the first queue and the segments of data indicated by the specification to be passed to the network protocol stack of the data processing system for subsequent protocol processing.

10. The method as claimed in claim 9, wherein the one or more second predetermined conditions include:
a) at least some of the data packets are fragmented;
b) at least some of the data packets are out of sequence;
c) at least some of the data packets do not contain a segment of data; and
d) the data packets are TCP/IP data packets and at least some of the data packets have one of RST, SYN or URG TCP flags set.

11. A data processing system having access to a memory and a network interface device capable of supporting a communication link over a network with another network interface device, the data processing system comprising:
an operating system having a network protocol stack;
the memory; and
a device driver of the network interface device configured to receive data packets from the network interface, each data packet comprising a header and a segment of data and being received by the network interface device over a communication link with another network interface device, said device driver configured to:

responsive to one or more second predetermined conditions being met, pass the data packets to the network protocol stack of the data processing system for subsequent protocol processing; and responsive to the one or more second predetermined conditions not being met, enqueue each data packet of a first set of data packets at a first queue in said memory, the first queue comprising at least a first data packet, to modify the header of the first data packet in the first queue so as to include the segment of data of each newly-enqueued data packet of the first set, and define a specification, the specification indicating the segments of data of the newly-enqueued data packets of the first set in the first queue;

the network protocol stack being configured to receive and protocol process a super packet comprising the header of the first data packet in the first queue and the segments of data indicated by the specification for subsequent protocol processing.

* * * * *